(12) United States Patent
Shahidi et al.

(10) Patent No.: US 12,302,273 B2
(45) Date of Patent: May 13, 2025

(54) TECHNIQUES FOR SHARING PROTOCOL DATA UNIT SESSIONS BETWEEN MULTIPLE SUBSCRIBER SERVICES

(71) Applicant: QUALCOMM Incorporated, San Diego, CA (US)

(72) Inventors: Reza Shahidi, La Jolla, CA (US); Bhupesh Manoharlal Umatt, Poway, CA (US); Vikram Singh, San Diego, CA (US); Suli Zhao, San Diego, CA (US); Carlos Marcelo Dias Pazos, Carlsbad, CA (US); Yong Xie, San Diego, CA (US); Sankalp Srivastava, Bangalore (IN); Ramananda Arkalgud Shelvananda, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/808,047

(22) Filed: Jun. 21, 2022

(65) Prior Publication Data
US 2022/0417886 A1 Dec. 29, 2022

Related U.S. Application Data

(60) Provisional application No. 63/202,771, filed on Jun. 23, 2021.

(51) Int. Cl.
*H04W 60/00* (2009.01)
*H04L 65/1016* (2022.01)
(Continued)

(52) U.S. Cl.
CPC ....... *H04W 60/005* (2013.01); *H04L 65/1016* (2013.01); *H04W 4/60* (2018.02); *H04W 48/18* (2013.01); *H04W 76/15* (2018.02)

(58) Field of Classification Search
CPC ..... H04W 60/005; H04W 4/60; H04W 48/18; H04W 76/15; H04L 65/1016; H04L 65/1073; H04L 65/1104
(Continued)

(56) References Cited

U.S. PATENT DOCUMENTS

| | | | |
|---|---|---|---|
| 7,440,440 B1 * | 10/2008 | Abichandani | H04M 3/42212 370/389 |
| 2023/0245085 A1 * | 8/2023 | Ene | G06Q 20/42 705/44 |

FOREIGN PATENT DOCUMENTS

| | | | | |
|---|---|---|---|---|
| WO | WO-2017136959 A1 * | 8/2017 | | H04L 65/1016 |
| WO | WO-2021034105 A1 * | 2/2021 | | |
| WO | WO-2022000129 A1 | 1/2022 | | |

OTHER PUBLICATIONS

3GPP TS 23.501, 3rd generation partnership project, mobile competence center; 650, route des lucioles; F-06921, Sophia-Antipolis Cedex; France, Mar. 2021 (Year: 2021).*

(Continued)

*Primary Examiner* — Tanmay K Shah
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may establish, via a first subscriber service, at least one protocol data unit (PDU) session. The UE may receive a first internet protocol (IP) address associated with the first subscriber service. The UE may register the first subscriber service with an IP multimedia subsystem (IMS) network using the first IP address. The UE may register a second subscriber service with the IMS network using a second IP address, wherein the second subscriber service uses the at
(Continued)

least one PDU session of the first subscriber service. Numerous other aspects are described.

30 Claims, 11 Drawing Sheets

(51) Int. Cl.
  *H04W 4/60* (2018.01)
  *H04W 48/18* (2009.01)
  *H04W 76/15* (2018.01)
(58) Field of Classification Search
  USPC ..................................................... 455/435.1
  See application file for complete search history.

(56) References Cited

OTHER PUBLICATIONS

3GPP TS 23.228, 3rd generation partnership project, mobile competence center; 650, route des lucioles; F-06921, Sophia-Antipolis Cedex; France, Mar. 2021 (Year: 2021).*

"3rd Generation Partnership Project, Technical Specification Group Services and System Aspects, IP Multimedia Subsystem(IMS), Stage 2 (Release 17)", 3GPP TS 23.228, 3GPP, Mobile Competence Centre, 650, Route Des Lucioles, F-06921 Sophia-Antipolis Cedex, France, vol. SA WG2, No. V17.0.0, Mar. 30, 2021, pp. 1-351, XP052000137, Clause 5.2.2.3, p. 78-p. 79, figure 5.1 clause 5.2.2.5, p. 81 Clause 4.3.3.2, p. 41.
"3rd Generation Partnership Project, Technical Specification Group Services and System Aspects, System architecture for the 5G System (5GS), Stage 2 (Release 17)", 3GPP TS 23.501, 3rd Generation Partnership Project, Mobile Competence Centre, 650, Route Des Lucioles, F-06921 Sophia-Antipolis Cedex, France, vol. SA WG2, No. V17.0.0, Mar. 30, 2021, pp. 1-482, XP052000157, Clause 5.8.2.2.3, p. 163 p. 161.
International Search Report and Written Opinion—PCT/US2022/073089—ISA/EPO—Oct. 11, 2022.

* cited by examiner

TECHNIQUES FOR SHARING PROTOCOL DATA UNIT SESSIONS BETWEEN MULTIPLE SUBSCRIBER SERVICES

CROSS-REFERENCE TO RELATED APPLICATION

This Patent application claims priority to U.S. Provisional Patent Application No. 63/202,771, filed on Jun. 23, 2021, entitled "TECHNIQUES FOR SHARING PROTOCOL DATA UNIT SESSIONS BETWEEN MULTIPLE SUBSCRIBER SERVICES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sharing protocol data unit sessions between multiple subscriber services.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include establishing, via a first subscriber service, at least one protocol data unit (PDU) session. The method may include obtaining a first internet protocol (IP) address associated with the first subscriber service. The method may include registering the first subscriber service with an IP multimedia subsystem (IMS) network using the first IP address. The method may include registering a second subscriber service with the IMS network using a second IP address, wherein the second subscriber service uses the at least one PDU session of the first subscriber service.

In some aspects, the at least one PDU session comprises a single PDU session, wherein the first subscriber service uses the single PDU session, and wherein the second subscriber service uses the single PDU session.

In some aspects, the at least one PDU session comprises a first PDU session and a second PDU session, wherein the first subscriber service uses the first PDU session, and wherein the second subscriber service uses the second PDU session.

In some aspects, the at least one PDU session uses a single transmission chain.

In some aspects, the method includes generating the second IP address based at least in part on: an IP prefix associated with the first subscriber service, and an interface identifier associated with the second subscriber service.

In some aspects, the method includes receiving an indication of the second IP address from a network associated with the at least one PDU session.

In some aspects, the method includes generating the first IP address based at least in part on: an IP prefix associated with the first subscriber service, and an interface identifier associated with the first subscriber service.

In some aspects, the method includes receiving an indication of the first IP address from a network associated with the at least one PDU session.

In some aspects, the first IP address and the second IP address comprise: a first IPv4 IP address and a second IPv4 address, or a first IPv6 IP address and a second IPv6 address.

In some aspects, registration of the first IP address comprises associating the first IP address with a first Session Initiation Protocol Uniform Resource Identifier (SIP-URI) of the first subscriber service, and registration of the second IP address comprises associating the second IP address with a second SIP-URI of the second subscriber service.

In some aspects, the method includes communicating, after registering the first subscriber service, via a first call associated with the first subscriber service; receiving, after registering the second subscriber service, a request to initiate a second call via the second subscriber service; initiating a hold on the first call associated with first subscriber service; and communicating via the second call using the at least one PDU session of the first subscriber service.

In some aspects, the second call comprises: a mobile terminated call, or a mobile originated call.

Some aspects described herein relate to a UE for wireless communication. The user equipment may include a memory and one or more processors coupled to the memory. The one or more processors may be configured to establish, via a first subscriber service, at least one PDU session. The one or more processors may be configured to obtain a first IP address associated with the first subscriber service. The one or more processors may be configured to register the first subscriber service with an IMS network using the first IP address. The one or more processors may be configured to register a second subscriber service with the IMS network using a second IP address, wherein the second subscriber service uses the at least one PDU session of the first subscriber service.

In some aspects, the at least one PDU session comprises a single PDU session, wherein the first subscriber service uses the single PDU session, and wherein the second subscriber service uses the single PDU session.

In some aspects, the at least one PDU session comprises a first PDU session and a second PDU session, wherein the first subscriber service uses the first PDU session, and wherein the second subscriber service uses the second PDU session.

In some aspects, the at least one PDU session uses a single transmission chain.

In some aspects, the one or more processors are further configured to generate the second IP address based at least in part on: an IP prefix associated with the first subscriber service, and an interface identifier associated with the second subscriber service.

In some aspects, the one or more processors are further configured to receive an indication of the second IP address from a network associated with the at least one PDU session.

In some aspects, the one or more processors are further configured to generate the first IP address based at least in part on: an IP prefix associated with the first subscriber service, and an interface identifier associated with the first subscriber service.

In some aspects, the one or more processors are further configured to receive an indication of the first IP address from a network associated with the at least one PDU session.

In some aspects, the first IP address and the second IP address comprise: a first IPv4 IP address and a second IPv4 address, or a first IPv6 IP address and a second IPv6 address.

In some aspects, the one or more processors, to register the first IP address, are configured to associate the first IP address with a first SIP-URI of the first subscriber service, and the one or more processors, to register the second IP address, are configured to associate the second IP address with a second SIP-URI of the second subscriber service.

In some aspects, the one or more processors are further configured to: communicate, after registering the first subscriber service, via a first call associated with the first subscriber service; receive, after registering the second subscriber service, a request to initiate a second call via the second subscriber service; initiate a hold on the first call associated with first subscriber service; and communicate via the second call using the at least one PDU session of the first subscriber service.

In some aspects, the second call comprises: a mobile terminated call, or a mobile originated call.

Some aspects described herein relate to a non-transitory computer-readable medium that stores a set of instructions for wireless communication by a UE. The set of instructions, when executed by one or more processors of the UE, may cause the UE to establish, via a first subscriber service, at least one PDU session. The set of instructions, when executed by one or more processors of the UE, may cause the UE to obtain a first IP address associated with the first subscriber service. The set of instructions, when executed by one or more processors of the UE, may cause the UE to register the first subscriber service with an IMS network using the first IP address. The set of instructions, when executed by one or more processors of the UE, may cause the UE to register a second subscriber service with the IMS network using a second IP address, wherein the second subscriber service uses the at least one PDU session of the first subscriber service.

In some aspects, the at least one PDU session comprises a single PDU session, wherein the first subscriber service uses the single PDU session, and wherein the second subscriber service uses the single PDU session.

In some aspects, the at least one PDU session comprises a first PDU session and a second PDU session, wherein the first subscriber service uses the first PDU session, and wherein the second subscriber service uses the second PDU session.

In some aspects, the at least one PDU session uses a single transmission chain.

In some aspects, the one or more instructions further cause the UE to generate the second IP address based at least in part on: an IP prefix associated with the first subscriber service, and an interface identifier associated with the second subscriber service.

In some aspects, the one or more instructions further cause the UE to receive an indication of the second IP address from a network associated with the at least one PDU session.

In some aspects, the one or more instructions further cause the UE to generate the first IP address based at least in part on: an IP prefix associated with the first subscriber service, and an interface identifier associated with the first subscriber service.

In some aspects, the one or more instructions further cause the UE to receive an indication of the first IP address from a network associated with the at least one PDU session.

In some aspects, the first IP address and the second IP address comprise: a first IPv4 IP address and a second IPv4 address, or a first IPv6 IP address and a second IPv6 address.

In some aspects, the one or more instructions, that cause the UE to register the first IP address, cause the UE to associate the first IP address with a first SIP-URI of the first subscriber service, and the one or more instructions, that cause the UE to register the second IP address, cause the UE to associate the second IP address with a second SIP-URI of the second subscriber service.

In some aspects, the one or more instructions further cause the UE to: communicate, after registering the first subscriber service, via a first call associated with the first subscriber service; receive, after registering the second subscriber service, a request to initiate a second call via the second subscriber service; initiate a hold on the first call associated with first subscriber service; and communicate via the second call using the at least one PDU session of the first subscriber service.

In some aspects, the second call comprises: a mobile terminated call, or a mobile originated call.

Some aspects described herein relate to an apparatus for wireless communication. The apparatus may include means for establishing, via a first subscriber service, at least one PDU session. The apparatus may include means for obtaining a first IP address associated with the first subscriber service. The apparatus may include means for registering the first subscriber service with an IMS network using the first IP address. The apparatus may include means for registering a second subscriber service with the IMS network using a second IP address, wherein the second subscriber service uses the at least one PDU session of the first subscriber service.

In some aspects, the at least one PDU session comprises a single PDU session, wherein the first subscriber service uses the single PDU session, and wherein the second subscriber service uses the single PDU session.

In some aspects, the at least one PDU session comprises a first PDU session and a second PDU session, wherein the first subscriber service uses the first PDU session, and wherein the second subscriber service uses the second PDU session.

In some aspects, the at least one PDU session uses a single transmission chain.

In some aspects, the apparatus includes means for generating the second IP address based at least in part on: an IP prefix associated with the first subscriber service, and an interface identifier associated with the second subscriber service.

In some aspects, the apparatus includes means for receiving an indication of the second IP address from a network associated with the at least one PDU session.

In some aspects, the apparatus includes means for generating the first IP address based at least in part on: an IP prefix associated with the first subscriber service, and an interface identifier associated with the first subscriber service.

In some aspects, the apparatus includes means for receiving an indication of the first IP address from a network associated with the at least one PDU session.

In some aspects, the first IP address and the second IP address comprise: a first IPv4 IP address and a second IPv4 address, or a first IPv6 IP address and a second IPv6 address.

In some aspects, the means registering of the first IP address comprises means for associating the first IP address with a first SIP-URI of the first subscriber service, and the means for registering the second IP address comprises means for associating the second IP address with a second SIP-URI of the second subscriber service.

In some aspects, the apparatus includes means for communicating, after registering the first subscriber service, via a first call associated with the first subscriber service; means for receiving, after registering the second subscriber service, a request to initiate a second call via the second subscriber service; means for initiating a hold on the first call associated with first subscriber service; and means for communicating via the second call using the at least one PDU session of the first subscriber service.

In some aspects, the second call comprises: a mobile terminated call, or a mobile originated call.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
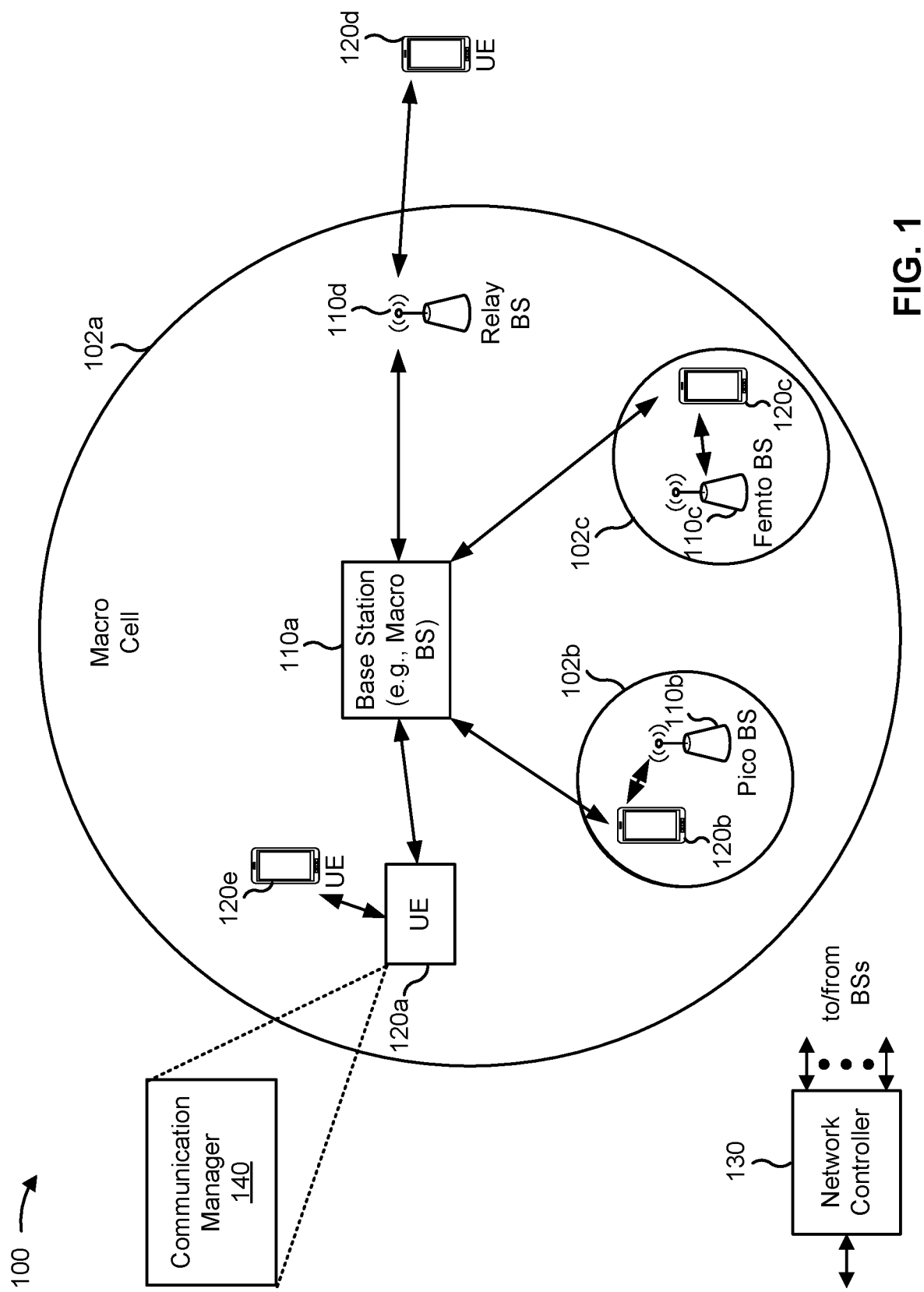
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (e.g., RAN network nodes shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may establish, via a first subscriber service, at least one PDU session; obtain a first IP address associated with the first subscriber service; register the first subscriber service with an IMS network using the first IP address; and register a second subscriber service with the IMS network using a second IP address, wherein the second subscriber service uses the at least one PDU session of the first subscriber service. Additionally, or alternatively, the communication manager 140 may perform one or more other operations described herein.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity," "network node," "RAN node," or "RAN network node" may refer to a disaggregated base station, or to one or more units of a disaggregated base station (such as one or more centralized units (CUs), one or more distributed units (DUs), one or more radio units (RUs), or a combination thereof). An aggregated base station may be configured to utilize a radio protocol stack that is physically or logically integrated within a single RAN network node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN network node, and one or more DUs may be co-located with the CU, or alternatively, may be geographically or virtually distributed throughout one or multiple other RAN network nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
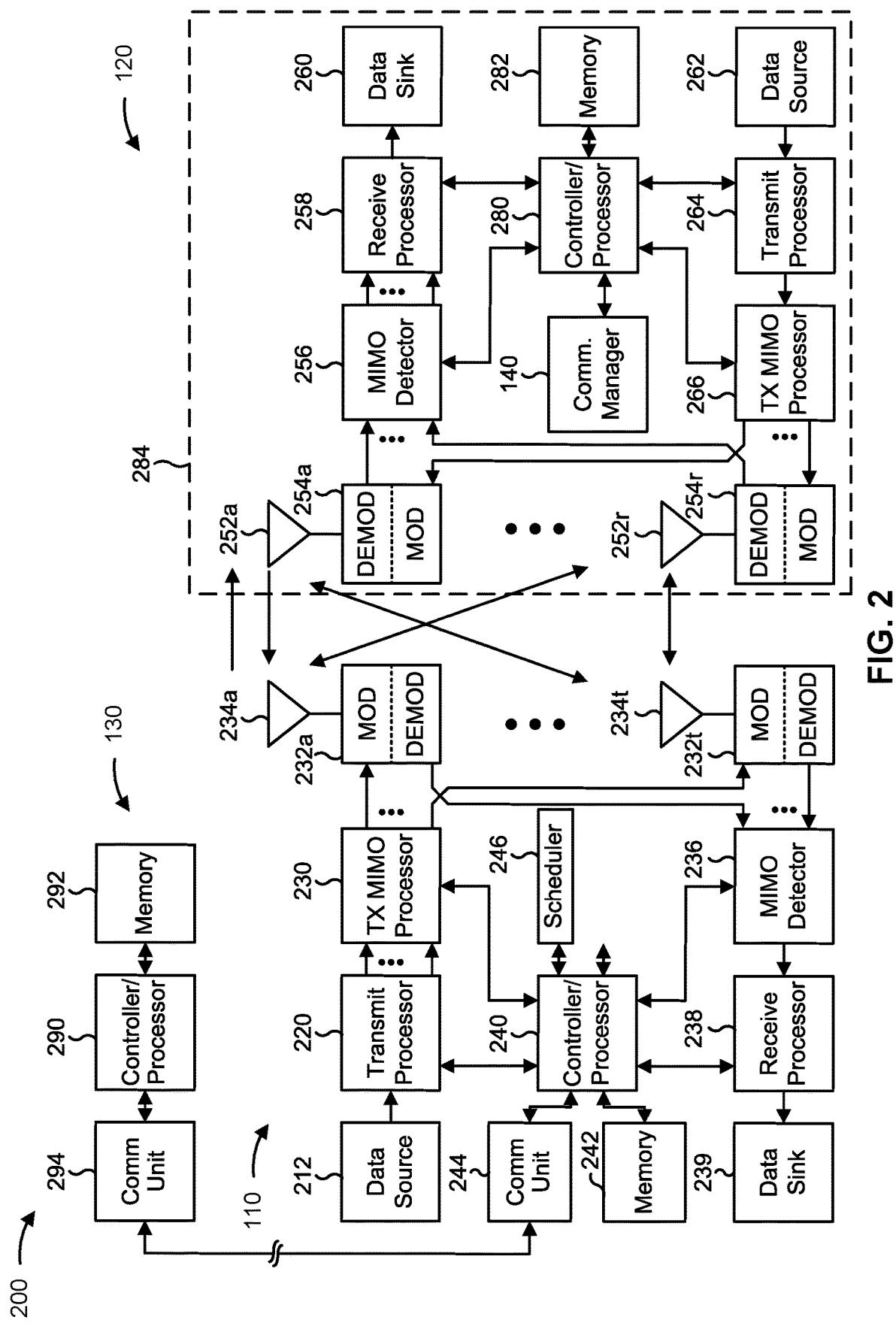
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with sharing protocol data unit sessions between multiple subscriber services, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, the UE includes means for establishing, via a first subscriber service, at least one PDU session; means for obtaining a first IP address associated with the first subscriber service; means for registering the first subscriber service with an IMS network using the first IP address; and/or means for registering a second subscriber service with the IMS network using a second IP address, wherein the second subscriber service uses the at least one PDU session of the first subscriber service. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
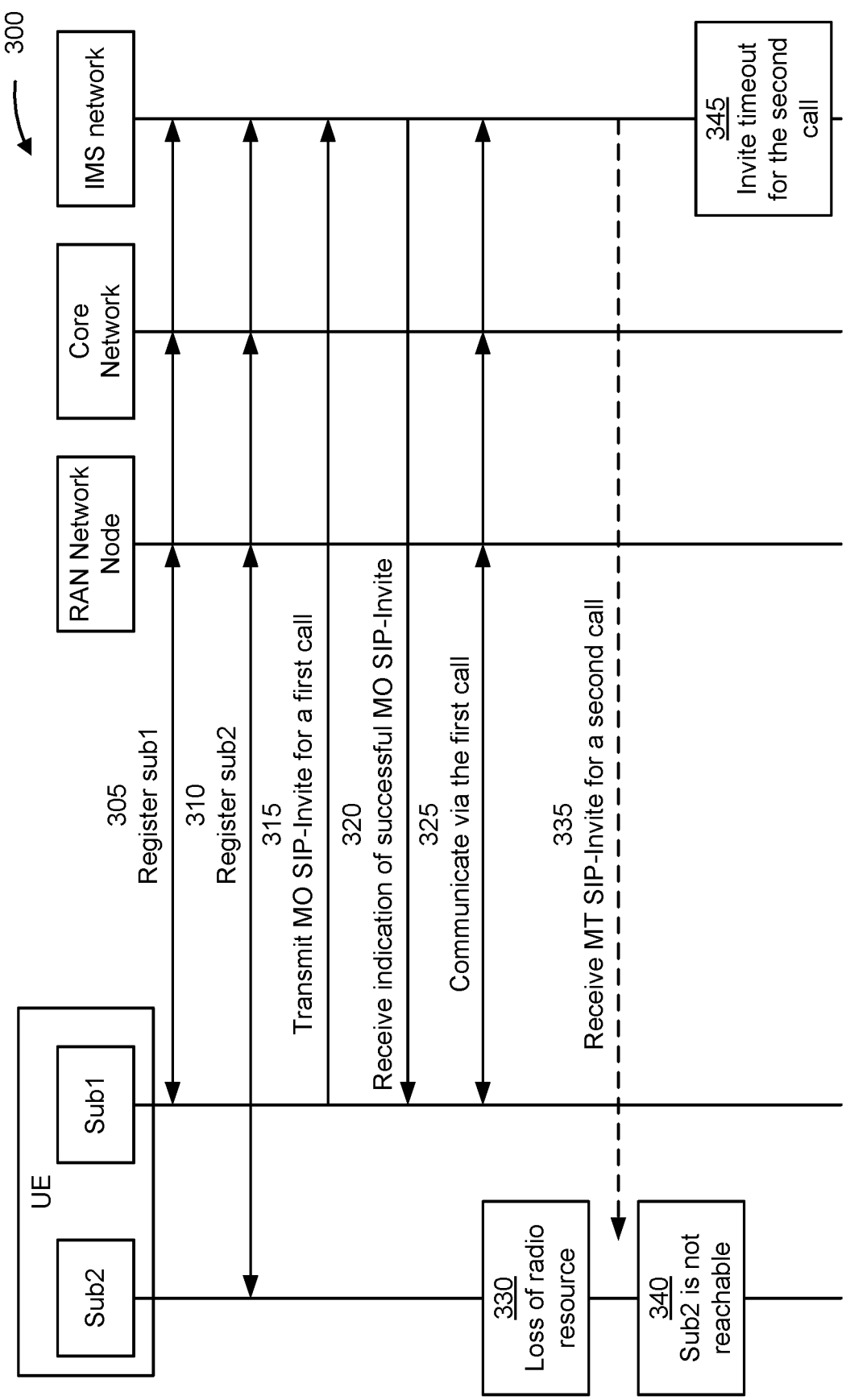
FIG. 3 is a diagram illustrating an example of communications in a dual subscriber service dual standby mode, in accordance with the present disclosure.

FIG. 3 is a diagram illustrating an example 300 of communications in a dual subscriber service dual standby mode, in accordance with the present disclosure. As shown in FIG. 3, a UE (e.g., UE 120) may communicate with a RAN network node (e.g., base station 110, a next generation (NextGen or NG) RAN, and/or an NG-RAN device, among other examples), a core network associated with the RAN network node (e.g., a 5G core network (5GC) and/or a 5GC device, among other examples), and/or an IMS network (e.g., IMS-Core network and/or an IMS-Core device), among other examples. For example, the UE may communicate with the IMS network via the RAN network node (e.g., RAN network node) and the core network. As further shown in FIG. 3, the UE may be configured as a dual subscriber service device (e.g., a dual subscriber identification module (SIM) device) based at least in part on being configured with a first subscriber service device (e.g., a first SIM card) and a second subscriber service device (e.g., a second SIM card).

As shown by reference number 305, the UE may register the first subscriber service (sub1) with the IMS network. As shown by reference number 310, the UE may register the second subscriber service (sub2) with the IMS network. Based at least in part on the UE registering the first subscriber service and the second subscriber service, the UE may be configured for receiving or initiating a call via the first subscriber service or the second subscriber service.

As shown by reference number 315, the UE may transmit, via the first subscriber service (e.g., via a communication path associated with the first subscriber service), a mobile originated (MO) session initiation protocol (SIP)-Invite for a first call. For example, the UE may transmit, to the IMS network, a request to initiate the first call using the first subscriber service.

As shown by reference number 320, the UE may receive, and the IMS network may provide (e.g., via the core network and/or the RAN network node), an indication of a successful MO SIP-Invite. For example, the IMS network may provide a 200OK answer to the MO SIP-Invite. Based at least in part on the UE receiving the indication of the successful MO SIP-Invite, the first call may be connected.

As shown by reference number 325, the UE may communicate via the first call associated with the first subscriber service using the RAN network node, the core network, and the IMS network.

As shown by reference number 330, the UE may lose radio resources associated with the second subscriber service. For example, the UE may lose radio resources associated with the second subscriber service based at least in part on the second subscriber service sharing hardware (e.g., a transmission chain) with the first subscriber service.

As shown by reference number 335, the IMS network may provide (e.g., via the core network and/or the RAN network node) a mobile terminated (MT) SIP-Invite for a second call associated with the second subscriber service.

As shown by reference number 340, the second subscriber service may be unreachable based at least in part on the loss of radio resources associated with the second subscriber service. In some aspects, the MT SIP-Invite (e.g., signaling associated with the MT SIP-Invite) may reach the UE, and may not be delivered to the second subscriber service based at least in part on the second subscriber service being unreachable. For example, communication resources of the UE may be occupied by the first call, which may cause the UE to be unable to receive and/or process the MT SIP-Invite for the second call.

As shown by reference number 345, the MT SIP-Invite for the second call may time out. Based at least in part on the UE being unaware of the MT SIP-Invite and/or failing to provide a notification of the second call to a user, the second call may fail, and network, communication, and/or power resources may be consumed for the failed second call and/or additional attempts to establish the second call. Additionally, or alternatively, advantages of a dual subscriber service configuration of the UE may be limited.

As indicated above, FIG. 3 is provided as an example. Other examples may differ from what is described with regard to FIG. 3.

In some aspects described herein, a UE may be configured to share one or more PDU sessions between multiple subscriber services (e.g., with two subscriber slots associated with a same IMS operator). For example, a UE may establish one or more PDU sessions via a first subscriber service. The UE may register the first subscriber service with an IMS network using a first IP address. The UE may then use the one or more PDU sessions to register a second subscriber service with the IMS network using a second IP address and/or to perform any SIP procedures for the second subscriber service. Based at least in part on the second subscriber service using a PDU session established via the first subscriber service, the second device may be reachable during a first call using the first subscriber service. In some aspects, the second subscriber service may be usable whether or not the second subscriber service had access to radio resources. In some aspects, the UE may operate using a dual SIM dual active (DSDA) configuration instead of falling back to a dual SIM dual standby (DSDS) configuration.

In this way, the UE may conserve power, communication, processing, and/or network resources that may be consumed by reentering a DSDA mode after the first call, and/or the UE may receive paging and/or receive or originate calls via the second subscriber service while engaged in the first call, among other examples.

Figure 4:
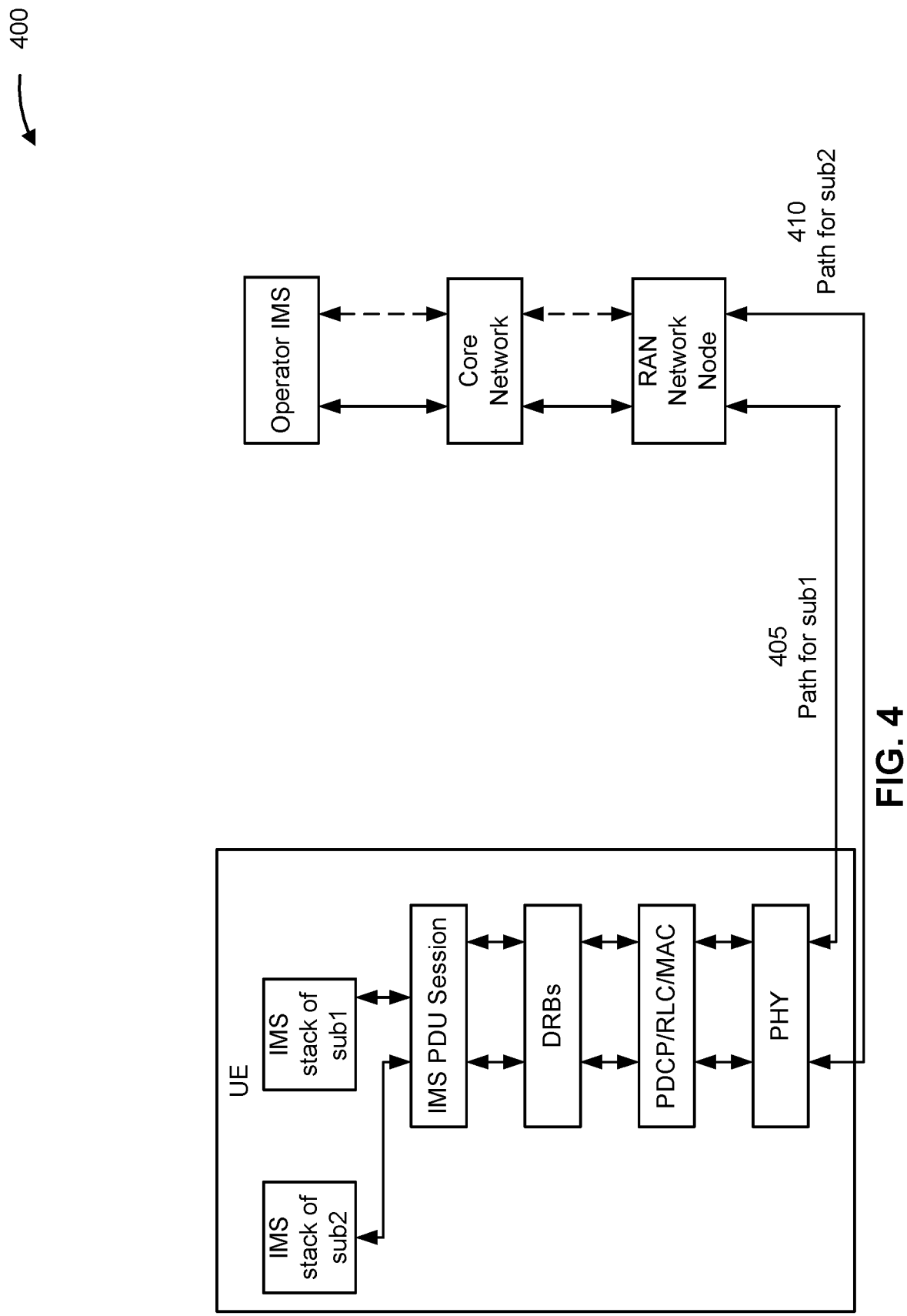
FIGS. 4-9 are diagrams illustrating examples associated with techniques for sharing protocol data unit sessions between multiple subscriber services, in accordance with the present disclosure.

FIG. 4 is a diagram illustrating an example 400 of techniques for sharing protocol data unit sessions between multiple subscriber services, in accordance with the present disclosure. As shown in FIG. 4, a UE (e.g., UE 120) may communicate with a RAN network node (e.g., base station 110, a NextGen RAN, and/or an NG-RAN device, among other examples), a core network associated with the RAN network node (e.g., a 5G core network (5GC), a 5GC device, an evolved packet core (EPC), an Access and Mobility Management Function (AMF), and/or a packet gateway (PGW) among other examples), and/or an operator of an IMS network (e.g., IMS-Core network and/or an IMS-Core device), among other examples. For example, the UE may communicate with the operator of the IMS network via the RAN network node and the core network. As further shown in FIG. 4, the UE is configured as a dual subscriber service device (e.g., a dual SIM device) based at least in part on being configured with a first subscriber service device (e.g., a first SIM card) and a second subscriber service device (e.g., a second SIM card).

As shown in FIG. 4, the UE may communicate, using the first subscriber service, via a path 405 for the first subscriber service. The path 405 includes an IMS PDU session layer, a data radio bearers (DRBs) layer, a Packet Data Convergence Protocol (PDCP) layer, a radio link control (RLC) layer, a medium access control (MAC) layer, and/or a physical (PHY) layer established for the first subscriber service. The path 405 further includes the RAN network node, the core network, and the operator of the IMS.

As further shown in FIG. 4, the UE may communicate, using the second subscriber service, via a path 410 for the second subscriber service. The path 410 includes the IMS PDU session layer, the DRBs layer, the PDCP layer, the RLC layer, the MAC layer, and/or the PHY layer established for the first subscriber service. In other words, the path 410 may share the IMS PDU session with the path 405. The path 410 further includes the RAN network node, the core network, and the operator of the IMS.

In some aspects, the UE establishes the IMS PDU session using the first subscriber service. The UE may register the first subscriber service with a first IP address and the second subscriber service with a second IP address using the IMS PDU session (e.g., a single IMS PDU session). In this way, two application function (AF) sessions are associated with a same IP connectivity access network (IP-CAN) session with different IP addresses and different UE identities (e.g., different International Mobile Subscriber Identities (IMSIs) and/or Subscription Permanent Identifiers (SUPIs), among other examples).

As indicated above, FIG. 4 is provided as an example. Other examples may differ from what is described with regard to FIG. 4.

Figure 5:
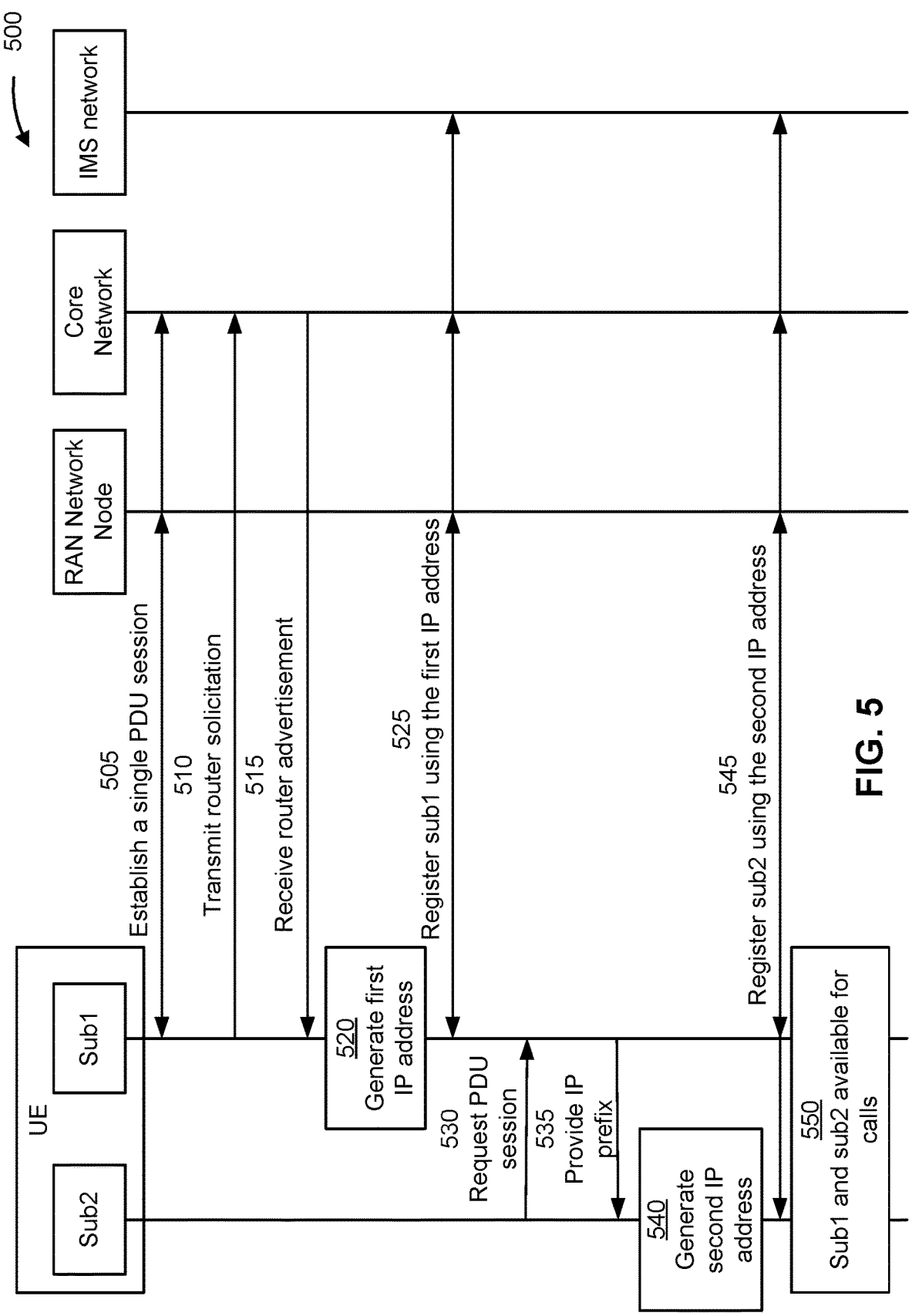

FIG. 5 is a diagram illustrating an example 500 of techniques for sharing protocol data unit sessions between multiple subscriber services, in accordance with the present disclosure. As shown in FIG. 5, a UE (e.g., UE 120) may communicate with a RAN network node (e.g., base station 110, an NG-RAN, and/or an NG-RAN device, among other examples), a core network associated with the RAN network node (e.g., a 5GC, a 5GC device, an EPC, an AMF, and/or a PGW among other examples), and/or an IMS network (e.g., IMS-Core network, an IMS operator, and/or an IMS-Core device), among other examples. For example, the UE may communicate with the IMS network via the RAN network node and the core network. As further shown in FIG. 5, the UE is configured as a dual subscriber service device based at least in part on being configured with a first subscriber service device (e.g., a first SIM card) and a second subscriber service device (e.g., a second SIM card).

As shown by reference number 505, the UE may establish a single PDU session with the RAN network node and the core network. For example, the UE may establish the single PDU session via one or more access operations, such as a random access channel (RACH) operation.

As shown by reference number 510, the UE may transmit, and the core network may receive, a router solicitation. The router solicitation may include a request to obtain a first IP address for communications associated with the first subscription service.

As shown by reference number 515, the UE may receive, and the core network may transmit (e.g., via the RAN network node), a router advertisement. The router advertisement may indicate the first IP address (e.g., an IPv4 IP address) or may indicate information for the UE to obtain the first IP address. For example, the router advertisement may indicate an IPv6 prefix that the UE may use to generate the first IP address.

As shown by reference number 520, the UE may generate the first IP address. In some aspects, the UE may generate the first IP address based at least in part on the router advertisement. For example, the UE may formulate the first IP address using the IPv6 prefix and an interface identifier (IID) associated with the first subscriber service (e.g., a SIM of the UE associated with the first subscriber service). In some aspects, the UE may generate the IID to use for formulating the first IP address.

As shown by reference number 525, the UE may register the first subscriber service using the first IP address. For example, the UE may perform an IMS registration operation with the IMS network to associate a first SIP-URI of the first subscriber service with the first IP address (e.g., a first contact address). In some aspects, the UE may register the first subscriber service using the single PDU session (e.g., via the RAN network node and the core network).

As shown by reference number 530, the second subscriber service may request, from the first subscriber service, access to the single PDU session. In some aspects, the second subscriber service may request access to the single PDU session based at least in part on losing access to radio resources, and/or initiation of a call associated with the first subscriber service, among other examples.

As shown by reference number 535, the first subscriber service may provide an IP prefix (e.g., the IP prefix received in connection with reference number 515) to the second subscriber service. In some aspects, the first subscriber service may indicate to the second subscriber service that the IMP PDU is established and/or that the second subscriber service is to use a same IP as the first subscriber service.

As shown by reference number 540, the second subscriber service may generate a second IP address associated with the second subscriber service. For example, the UE may formulate the second IP address using the IPv6 prefix (e.g., the same IPv6 prefix used to generate the first IP address) and an IID associated with the second subscriber service (e.g., a SIM of the UE associated with the second subscriber service). In some aspects, the UE may generate the IID to use for formulating the second IP address.

In some aspects, the first subscriber service and the second subscriber service may be logically separated in the UE (e.g., using same components) or may use different components of the UE. For example, the UE may determine to share, with the second subscriber service, the single PDU session established for the first subscriber service and generate the second IP address based at least in part on the IP prefix previously received.

As shown by reference number 545, the UE may register the second subscriber service, with the IMS network, using the second IP address. For example, the UE may transmit, via the single PDU session, a request to register the second IP address to the IMS network.

As shown by reference number 550, the first subscriber service and the second subscriber service may be available for calls. For example, if a call is intended for the second subscriber service, the UE may receive the call based at least in part on the second subscriber service having access to radio resources associated with the single PDU session. The UE may be configured for DSDA behavior and/or may be configuration to participate in mobile originated or mobile terminated calls via both subscriber services (e.g., one at a time).

In some aspects, the first subscriber service and the second subscriber service may have a same prefix (e.g., prefix=2409:811f:9722:1683) and different interface identities. For example, the first subscriber service may have a first interface identity (e.g., iid=c80b:b3ff:fe08:8aae) and the second subscriber service may have a first interface identity (e.g., iid=1698:6f6:e7c2:c392). In this way, both subscriber services may share an IMS PDU session of the first subscriber service.

As indicated above, FIG. 5 is provided as an example. Other examples may differ from what is described with regard to FIG. 5.

Figure 6:
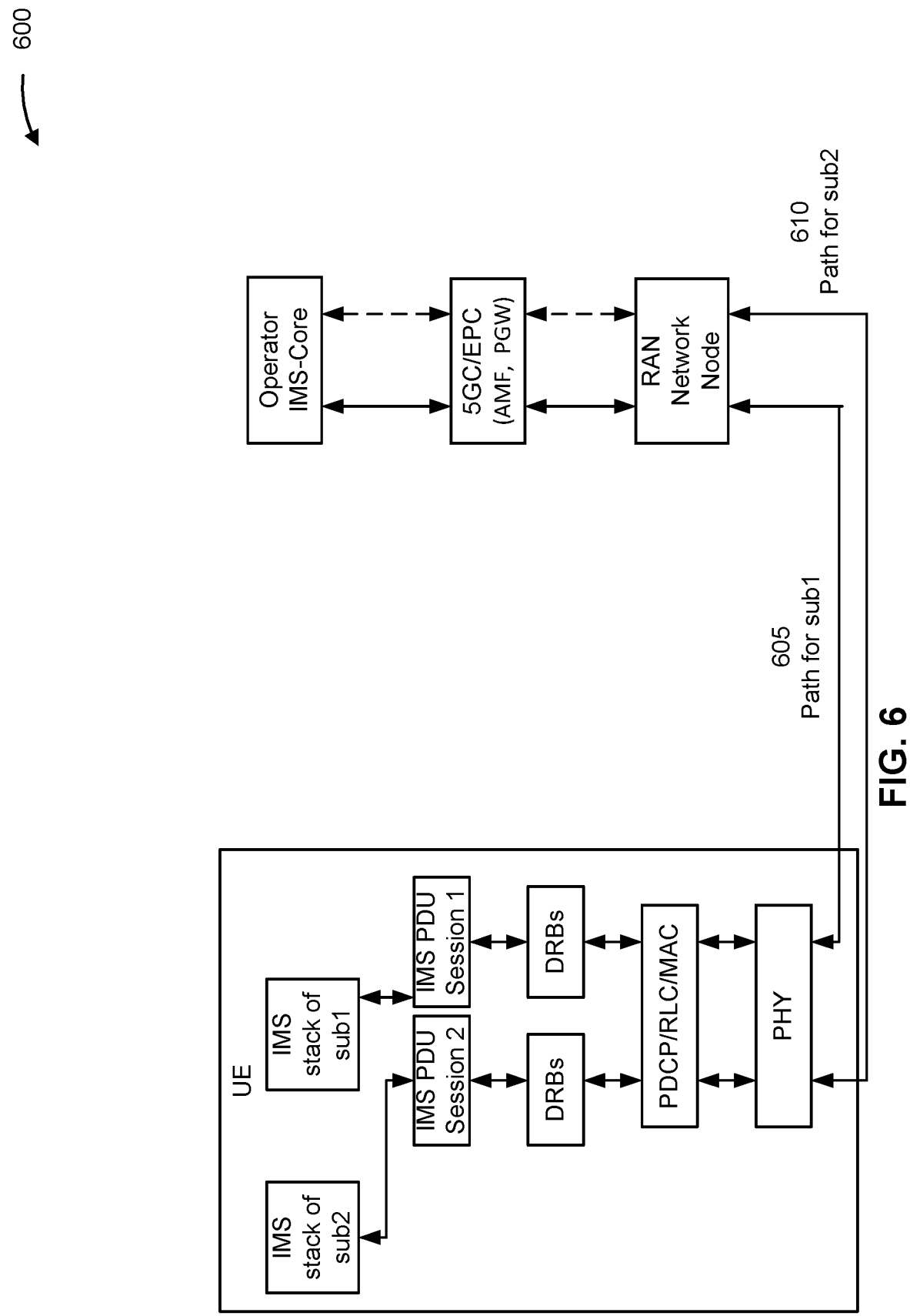

FIG. 6 is a diagram illustrating an example 600 of techniques for sharing protocol data unit sessions between multiple subscriber services, in accordance with the present disclosure. As shown in FIG. 6, a UE (e.g., UE 120) may communicate with a RAN network node (e.g., base station 110, a NextGen RAN, and/or an NG-RAN device, among other examples), a core network associated with the RAN network node (e.g., a 5G core network (5GC), a 5GC device, an EPC, an AMF, and/or a PGW among other examples), and/or an operator of an IMS network (e.g., IMS-Core network and/or an IMS-Core device), among other examples. For example, the UE may communicate with the operator of the IMS network via the RAN network node and the core network. As further shown in FIG. 6, the UE is configured as a dual subscriber service device (e.g., a dual SIM device) based at least in part on being configured with a first subscriber service device (e.g., a first SIM card) and a second subscriber service device (e.g., a second SIM card).

As shown in FIG. 6, the UE may communicate, using the first subscriber service, via a path 605 for the first subscriber service. The path 605 includes a first IMS PDU session layer established via the first subscriber service, a first DRBs layer established via the first subscriber service, a PDCP layer, an RLC layer, a MAC layer, and/or a physical (PHY) layer established for the first subscriber service. The path 605 further includes the RAN network node, the core network, and the operator of the IMS.

As further shown in FIG. 6, the UE may communicate, using the second subscriber service, via a path 610 for the second subscriber service. The path 610 includes a second IMS PDU session layer established via the first subscriber service, a second DRBs layer, the PDCP layer, the RLC layer, the MAC layer, and/or the PHY layer established for the first subscriber service. In other words, the path 610 may have access to the second IMS PDU session that is different from the first IMS PDU session for the path 605. The path 610 further includes the RAN network node, the core network, and the operator of the IMS.

In some aspects, the UE establishes the first IMS PDU session using the first subscriber service and establishes the second IMS PDU session (for the second subscriber service) using the first subscriber service. The UE may register the first subscriber service with a first IP address using the first IMS PDU session and the second subscriber service with a second IP address using the second IMS PDU session. In this way, two AF sessions are associated with different IP-CAN sessions and with different UE identities.

As indicated above, FIG. 6 is provided as an example. Other examples may differ from what is described with regard to FIG. 6.

Figure 7:
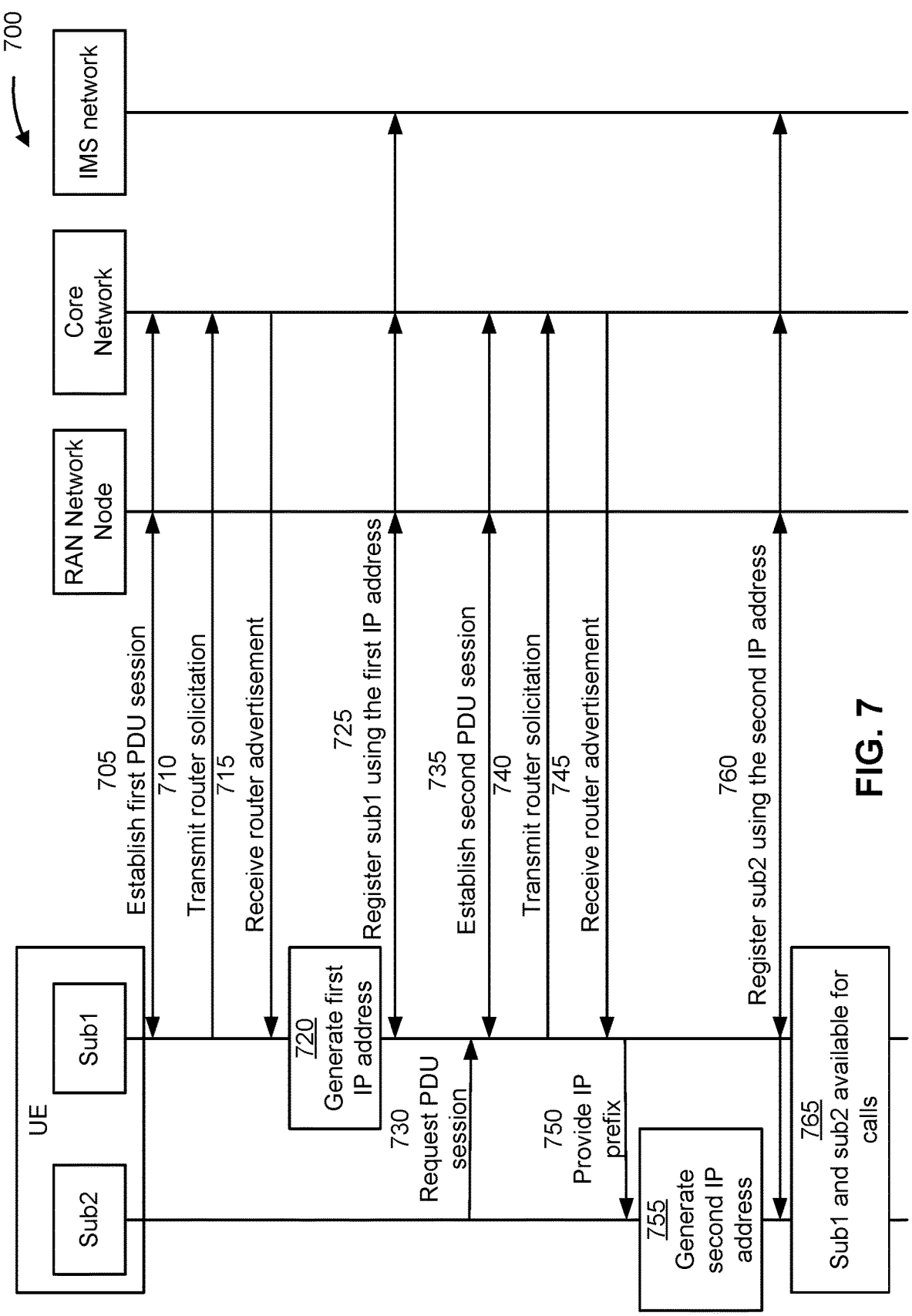

FIG. 7 is a diagram illustrating an example 700 of techniques for sharing protocol data unit sessions between multiple subscriber services, in accordance with the present disclosure. As shown in FIG. 7, a UE (e.g., UE 120) may communicate with a RAN network node (e.g., base station

110, an NG-RAN, and/or an NG-RAN device, among other examples), a core network associated with the RAN network node (e.g., a 5GC, a 5GC device, an EPC, an AMF, and/or a PGW among other examples), and/or an IMS network (e.g., IMS-Core network, an IMS operator, and/or an IMS-Core device), among other examples. For example, the UE may communicate with the IMS network via the RAN network node and the core network. As further shown in FIG. 7, the UE is configured as a dual subscriber service device based at least in part on being configured with a first subscriber service device (e.g., a first SIM card) and a second subscriber service device (e.g., a second SIM card).

As shown by reference number 705, the UE may establish a first PDU session with the RAN network node and the core network. For example, the UE may establish the first PDU session via one or more access operations, such as a RACH operation.

As shown by reference number 710, the UE may transmit, and the core network may receive, a router solicitation. The router solicitation may include a request to obtain a first IP address for communications associated with the first subscription service.

As shown by reference number 715, the UE may receive, and the core network may transmit (e.g., via the RAN network node), a router advertisement. The router advertisement may indicate the first IP address (e.g., an IPv4 IP address) or may indicate information for the UE to obtain the first IP address. For example, the router advertisement may indicate an IPv6 prefix that the UE may use to generate the first IP address.

As shown by reference number 720, the UE may generate the first IP address. In some aspects, the UE may generate the first IP address based at least in part on the router advertisement. For example, the UE may formulate the first IP address using the IPv6 prefix and an IID associated with the first subscriber service (e.g., a SIM of the UE associated with the first subscriber service).

As shown by reference number 725, the UE may register the first subscriber service using the first IP address. For example, the UE may perform an IMS registration operation with the IMS network to associate a first SIP-URI of the first subscriber service with the first IP address (e.g., a first contact address). In some aspects, the UE may register the first subscriber service using the first PDU session (e.g., via the RAN network node and the core network).

As shown by reference number 730, the second subscriber service may request, from the first subscriber service, access to a second PDU session. In some aspects, the second subscriber service may request access to the second PDU session based at least in part on losing access to radio resources, and/or initiation of a call associated with the first subscriber service, among other examples.

As shown by reference number 735, the UE may establish the second PDU session, using resources of the first subscriber service, with the RAN network node and the core network. For example, the UE may establish the second PDU session via one or more access operations, such as a RACH operation.

As shown by reference number 740, the UE may transmit, and the core network may receive, a router solicitation. The router solicitation may include a request to obtain a second IP address for communications associated with the second subscription service.

As shown by reference number 745, the UE may receive, and the core network may transmit (e.g., via the RAN network node), a router advertisement. The router advertisement may indicate the second IP address (e.g., an IPv4 IP address) or may indicate information for the UE to obtain the second IP address. For example, the router advertisement may indicate an IPv6 prefix (e.g., that is different from the IPv6 prefix used to generate the first IP address) that the UE may use to generate the second IP address.

As shown by reference number 750, the UE may provide, from the first subscriber service to the second provider service, an IP prefix (e.g., the IPv6 prefix) or an indication of the second IP address.

As shown by reference number 755, the second subscriber service may generate a second IP address associated with the second subscriber service. For example, the UE may formulate the second IP address using the IPv6 prefix (e.g., a different IPv6 prefix than that used to generate the first IP address) and an IID associated with the second subscriber service (e.g., a SIM of the UE associated with the second subscriber service).

As shown by reference number 760, the UE may register the second subscriber service, with the IMS network, using the second IP address. For example, the UE may transmit, via the single PDU session, a request to register the second IP address to the IMS network.

As shown by reference number 765, the first subscriber service and the second subscriber service may be available for calls. For example, if a call is intended for the second subscriber service, the UE may receive the call based at least in part on the second subscriber service having access to radio resources associated with the second PDU session.

As indicated above, FIG. 7 is provided as an example. Other examples may differ from what is described with regard to FIG. 7.

Figure 8:
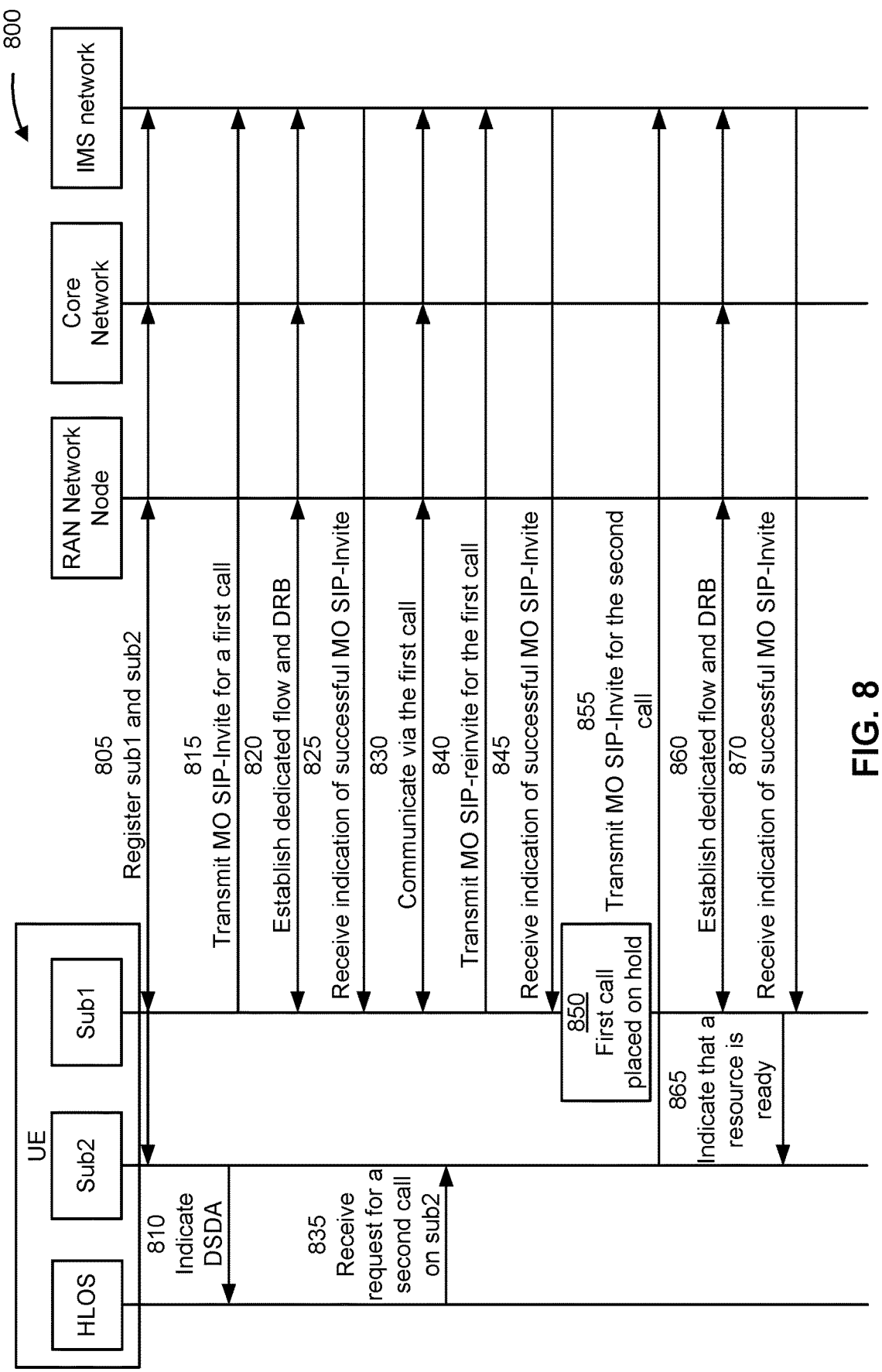

FIG. 8 is a diagram illustrating an example 800 of techniques for sharing protocol data unit sessions between multiple subscriber services, in accordance with the present disclosure. Example 800 illustrates operations associated with initiating a mobile originated call via a subscriber service that uses radio resources associated with another subscriber service. As shown in FIG. 8, a UE (e.g., UE 120) may communicate with a RAN network node (e.g., base station 110, an NG-RAN, and/or an NG-RAN device, among other examples), a core network associated with the RAN network node (e.g., a 5GC, a 5GC device, an EPC, an AMF, and/or a PGW among other examples), and/or an IMS network (e.g., IMS-Core network, an IMS operator, and/or an IMS-Core device), among other examples. For example, the UE may communicate with the IMS network via the RAN network node and the core network. As further shown in FIG. 8, the UE is configured as a dual subscriber service device based at least in part on being configured with a first subscriber service device (e.g., a first SIM card) and a second subscriber service device (e.g., a second SIM card).

As shown by reference number 805, the UE may register the first subscriber service and a second subscriber service with the IMS network. In some aspects, the UE may register the first subscriber service and the second subscriber service using a technique described in connection with any of FIGS. 4-7.

As shown by reference number 810, the second subscriber service may provide an indication to a high level operating system (HLOS) to provide an indication of a configuration of DSDA mode for the UE. For example, the indication may indicate that calls may be made using either subscriber service.

As shown by reference number 815, the UE may transmit, via the first subscriber service (e.g., via a communication path associated with the first subscriber service), a mobile originated SIP-Invite for a first call. For example, the UE may transmit, to the IMS network, a request to initiate the first call using the first subscriber service.

As shown by reference number 820, the UE and the IMS network may establish a dedicated flow (e.g., a communication path) and one or more DRBs for the first call.

As shown by reference number 825, the UE may receive, and the IMS network may provide (e.g., via the core network and/or the RAN network node), an indication of a successful MO SIP-Invite. For example, the IMS network may provide a 2000K answer to the MO SIP-Invite. Based at least in part on the UE receiving the indication of the successful MO SIP-Invite, the first call may be connected.

As shown by reference number 830, the UE may communicate via the first call associated with the first subscriber service using the RAN network node, the core network, and the IMS network.

As shown by reference number 835, the HLOS may provide, to the second subscriber service, a request for a second call on the second subscriber service. For example, the HLOS may receive an input from a user to initiate the second call while the first call is ongoing.

As shown by reference number 840, the UE may transmit an MO SIP-reinvite for the first call. The MO SIP re-invite may indicate a request to hold the first call.

As shown by reference number 845, the UE may receive, and the IMS network may provide (e.g., via the core network and/or the RAN network node), an indication of a successful MO SIP-reinvite. For example, the IMS network may provide a 2000K answer to the MO SIP-reinvite that indicates approval to hold the first call.

As shown by reference number 850, the first call may be placed on hold, based at least in part on the UE receiving the indication of the successful MO SIP-reinvite.

As shown by reference number 855, the UE may transmit, via the second subscriber service using a communication path associated with the second subscriber service, a mobile originated SIP-Invite for the second call. For example, the UE may transmit, to the IMS network, a request to initiate the second call using a single PDU session or using a dedicated PDU session that uses radio resources of the first subscriber service.

As shown by reference number 860, the UE and the IMS network may establish a dedicated flow (e.g., a communication path) and one or more DRBs for the second call.

As shown by reference number 865, the UE may provide, from the first subscriber service to the second subscriber service, an indication that a resource is ready. In some aspects, the resource includes a dedicated PDU session that uses radio resources of the first subscriber service. In some aspects, the resource includes a single PDU session shared with the first subscriber resource that uses radio resources of the first subscriber service.

As shown by reference number 870, the UE may receive, and the IMS network may provide (e.g., via the core network and/or the RAN network node), an indication of a successful MO SIP-Invite. For example, the IMS network may provide a 2000K answer to the MO SIP-Invite. Based at least in part on the UE receiving the indication of the successful MO SIP-Invite, the second call may be connected.

As indicated above, FIG. 8 is provided as an example. Other examples may differ from what is described with regard to FIG. 8.

Figure 9:
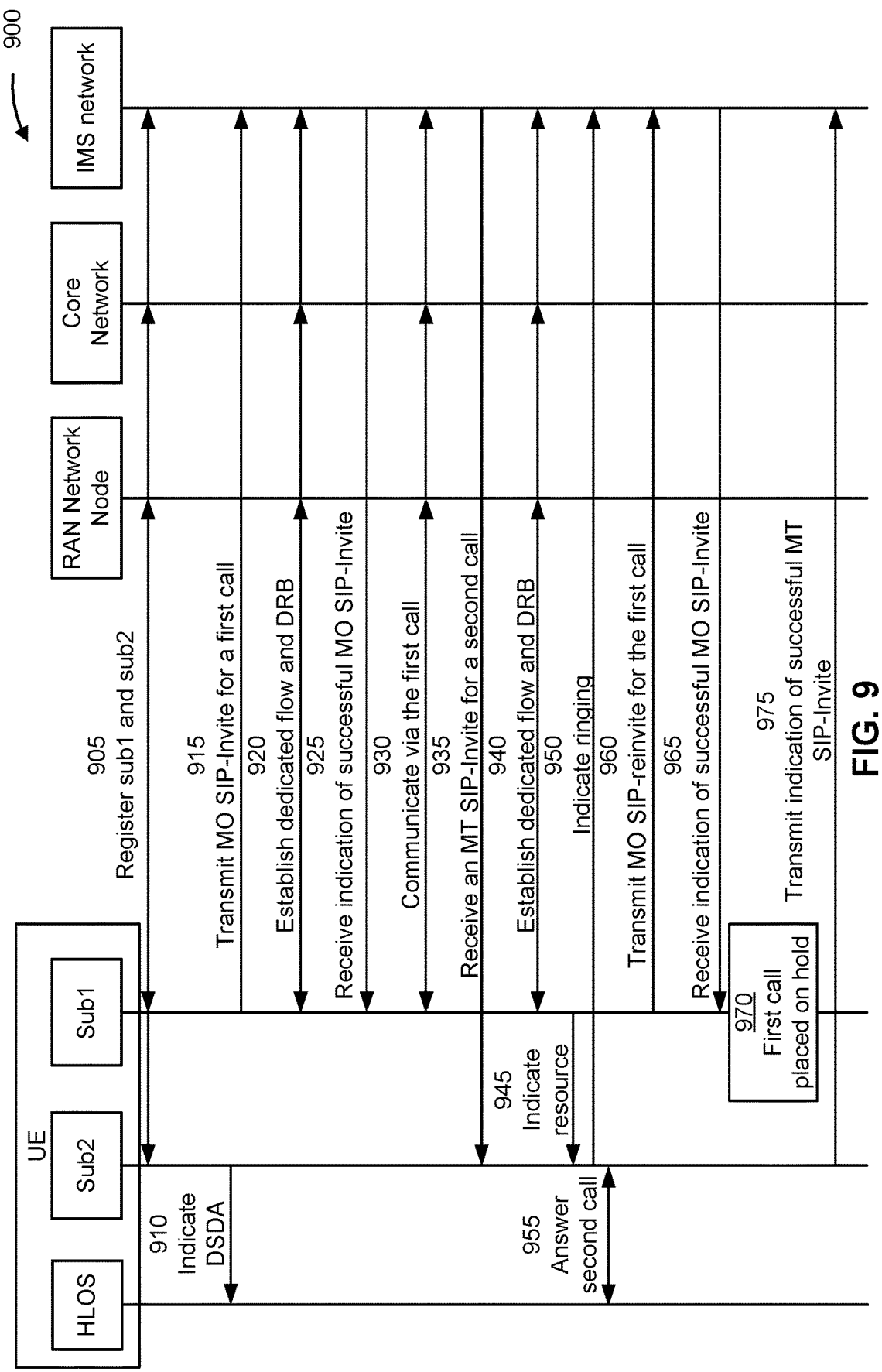

FIG. 9 is a diagram illustrating an example 900 of techniques for sharing protocol data unit sessions between multiple subscriber services, in accordance with the present disclosure. Example 900 illustrates operations associated with initiating a mobile originated call via a subscriber service that uses radio resources associated with another subscriber service. As shown in FIG. 9, a UE (e.g., UE 120) may communicate with a RAN network node (e.g., base station 110, an NG-RAN, and/or an NG-RAN device, among other examples), a core network associated with the RAN network node (e.g., a 5GC, a 5GC device, an EPC, an AMF, and/or a PGW among other examples), and/or an IMS network (e.g., IMS-Core network, an IMS operator, and/or an IMS-Core device), among other examples. For example, the UE may communicate with the IMS network via the RAN network node and the core network. As further shown in FIG. 9, the UE is configured as a dual subscriber service device based at least in part on being configured with a first subscriber service device (e.g., a first SIM card) and a second subscriber service device (e.g., a second SIM card).

As shown by reference number 905, the UE may register the first subscriber service and a second subscriber service with the IMS network. In some aspects, the UE may register the first subscriber service and the second subscriber service using a technique described in connection with any of FIGS. 4-7.

As shown by reference number 910, the second subscriber service may provide an indication to an HLOS to provide an indication of a configuration of DSDA mode for the UE. For example, the indication may indicate that calls may be made using either subscriber service.

As shown by reference number 915, the UE may transmit, via the first subscriber service (e.g., via a communication path associated with the first subscriber service), a mobile originated SIP-Invite for a first call. For example, the UE may transmit, to the IMS network, a request to initiate the first call using the first subscriber service.

As shown by reference number 920, the UE and the IMS network may establish a dedicated flow (e.g., a communication path) and one or more DRBs for the first call.

As shown by reference number 925, the UE may receive, and the IMS network may provide (e.g., via the core network and/or the RAN network node), an indication of a successful MO SIP-Invite. For example, the IMS network may provide a 2000K answer to the MO SIP-Invite. Based at least in part on the UE receiving the indication of the successful MO SIP-Invite, the first call may be connected.

As shown by reference number 930, the UE may communicate via the first call associated with the first subscriber service using the RAN network node, the core network and the IMS network.

As shown by reference number 935, the UE may receive, via the second subscriber service (e.g., via a communication path associated with the second subscriber service), a mobile terminated SIP-Invite for a second call. For example, the UE may receive, from the IMS network, a request to initiate the second call using the second subscriber service. The UE may transmit a response to the mobile terminated SIP-Invite for the second call, such as a 183 session progress report to indicate that the second subscriber service is reachable (e.g., has resources available).

As shown by reference number 940, the UE and the IMS network may establish a dedicated flow (e.g., a communication path) and one or more DRBs for the second call. In some aspects, the UE may transmit, via the second subscriber service, a 183 session progress message to the IMS network.

As shown by reference number 945, the UE may provide, from the first subscriber service to the second subscriber service, an indication of a resource to use for receiving a notification of the second call. For example, the UE may provide an indication that the resource is ready for use.

As shown by reference number 950, the second subscriber service may provide an indication to the IMS network that the second call is ringing at the UE.

As shown by reference number 955, the UE may receive input to answer the second call. For example, the UE may provide, from the second subscriber service to the HLOS, an indication of the second call, the HLOS may receive an input (e.g., from a user) to answer the second call, and/or the HLOS may provide a request to answer the second call to the second subscriber service.

As shown by reference number 960, the UE may transmit an MO SIP-reinvite for the first call. The MO SIP re-invite may indicate a request to hold the first call.

As shown by reference number 965, the UE may receive, and the IMS network may provide (e.g., via the core network and/or the RAN network node), an indication of a successful MO SIP-reinvite. For example, the IMS network may provide a 2000K answer to the MO SIP-reinvite that indicates approval to hold the first call.

As shown by reference number 970, the first call may be placed on hold, based at least in part on the UE receiving the indication of the successful MO SIP-reinvite.

As shown by reference number 975, the UE may transmit, and the IMS network may receive (e.g., via the core network and/or the RAN network node), an indication of a successful MT SIP-invite. For example, the UE may provide a 2000K answer to the mobile originated SIP-invite that indicates to initiate the second call. Based at least in part on transmitting the indication of the successful mobile terminated SIP-invite, the second call may be established.

As indicated above, FIG. 9 is provided as an example. Other examples may differ from what is described with regard to FIG. 9.

Figure 10:
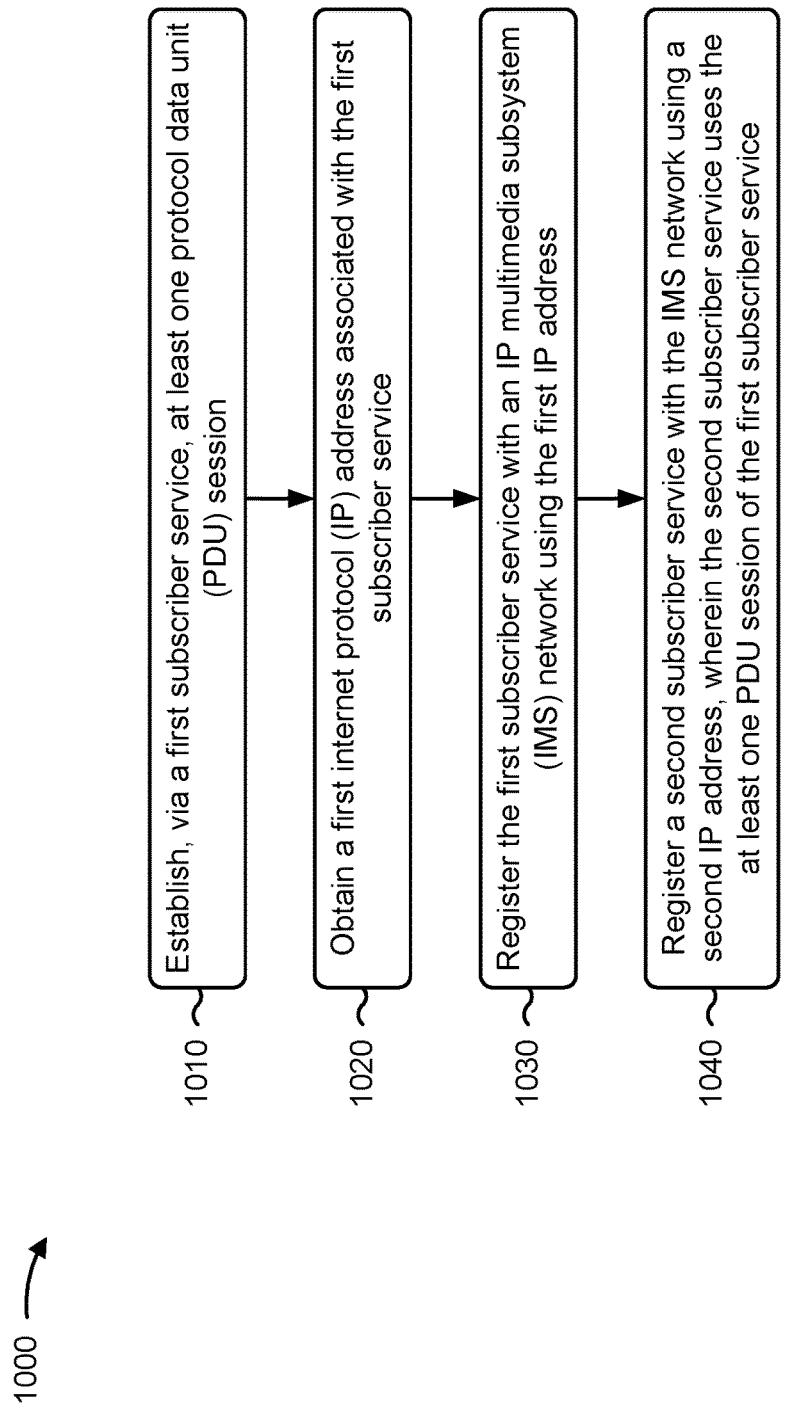
FIG. 10 is a diagram illustrating an example process associated with techniques for sharing protocol data unit sessions between multiple subscriber services, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with techniques for sharing PDU sessions between multiple subscriber services.

As shown in FIG. 10, in some aspects, process 1000 may include establishing, via a first subscriber service, at least one PDU session (block 1010). For example, the UE (e.g., using communication manager 140, reception component 1102 and/or transmission component 1104, depicted in FIG. 11) may establish, via a first subscriber service, at least one PDU session, as described above.

As further shown in FIG. 10, in some aspects, process 1000 may include obtaining a first IP address associated with the first subscriber service (block 1020). For example, the UE (e.g., using communication manager 140 and/or reception component 1102, depicted in FIG. 11) may obtain a first IP address associated with the first subscriber service, as described above.

As further shown in FIG. 10, in some aspects, process 1000 may include registering the first subscriber service with an IMS network using the first IP address (block 1030). For example, the UE (e.g., using communication manager 140 reception component 1102 and/or transmission component 1104, depicted in FIG. 11) may register the first subscriber service with an IMS network using the first IP address, as described above.

As further shown in FIG. 10, in some aspects, process 1000 may include registering a second subscriber service with the IMS network using a second IP address, wherein the second subscriber service uses the at least one PDU session of the first subscriber service (block 1040). For example, the UE (e.g., using communication manager 140 and/or reception component 1102, depicted in FIG. 11) may register a second subscriber service with the IMS network using a second IP address, wherein the second subscriber service uses the at least one PDU session of the first subscriber service, as described above.

Process 1000 may include additional aspects, such as any single aspect or any combination of aspects described below and/or in connection with one or more other processes described elsewhere herein.

In a first aspect, the at least one PDU session comprises a single PDU session, the first subscriber service uses the single PDU session, and the second subscriber service uses the single PDU session.

In a second aspect, alone or in combination with the first aspect, the at least one PDU session comprises a first PDU session and a second PDU session, the first subscriber service uses the first PDU session, and the second subscriber service uses the second PDU session.

In a third aspect, alone or in combination with one or more of the first and second aspects, the at least one PDU session uses a single transmission chain.

In a fourth aspect, alone or in combination with one or more of the first through third aspects, process 1000 includes generating the second IP address based at least in part on an IP prefix associated with the first subscriber service, and an IID associated with the second subscriber service.

In a fifth aspect, alone or in combination with one or more of the first through fourth aspects, process 1000 includes receiving an indication of the second IP address from a network associated with the at least one PDU session.

In a sixth aspect, alone or in combination with one or more of the first through fifth aspects, process 1000 includes generating the first IP address based at least in part on an IP prefix associated with the first subscriber service, and an IID associated with the first subscriber service.

In a seventh aspect, alone or in combination with one or more of the first through sixth aspects, process 1000 includes receiving an indication of the first IP address from a network associated with the at least one PDU session.

In an eighth aspect, alone or in combination with one or more of the first through seventh aspects, the first IP address and the second IP address comprise a first IPv4 IP address and a second IPv4 address, or a first IPv6 IP address and a second IPv6 address.

In a ninth aspect, alone or in combination with one or more of the first through eighth aspects, registration of the first IP address comprises associating the first IP address with a first SIP-URI of the first subscriber service, and registration of the second IP address comprises associating the second IP address with a second SIP-URI of the second subscriber service.

In a tenth aspect, alone or in combination with one or more of the first through ninth aspects, process 1000 includes communicating, after registering the first subscriber service, via a first call associated with the first subscriber service, receiving, after registering the second subscriber service, a request to initiate a second call via the second subscriber service, initiating a hold on the first call associated with first subscriber service, and communicating via the second call using the at least one PDU session of the first subscriber service.

In an eleventh aspect, alone or in combination with one or more of the first through tenth aspects, the second call comprises a mobile terminated call, or a mobile originated call.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
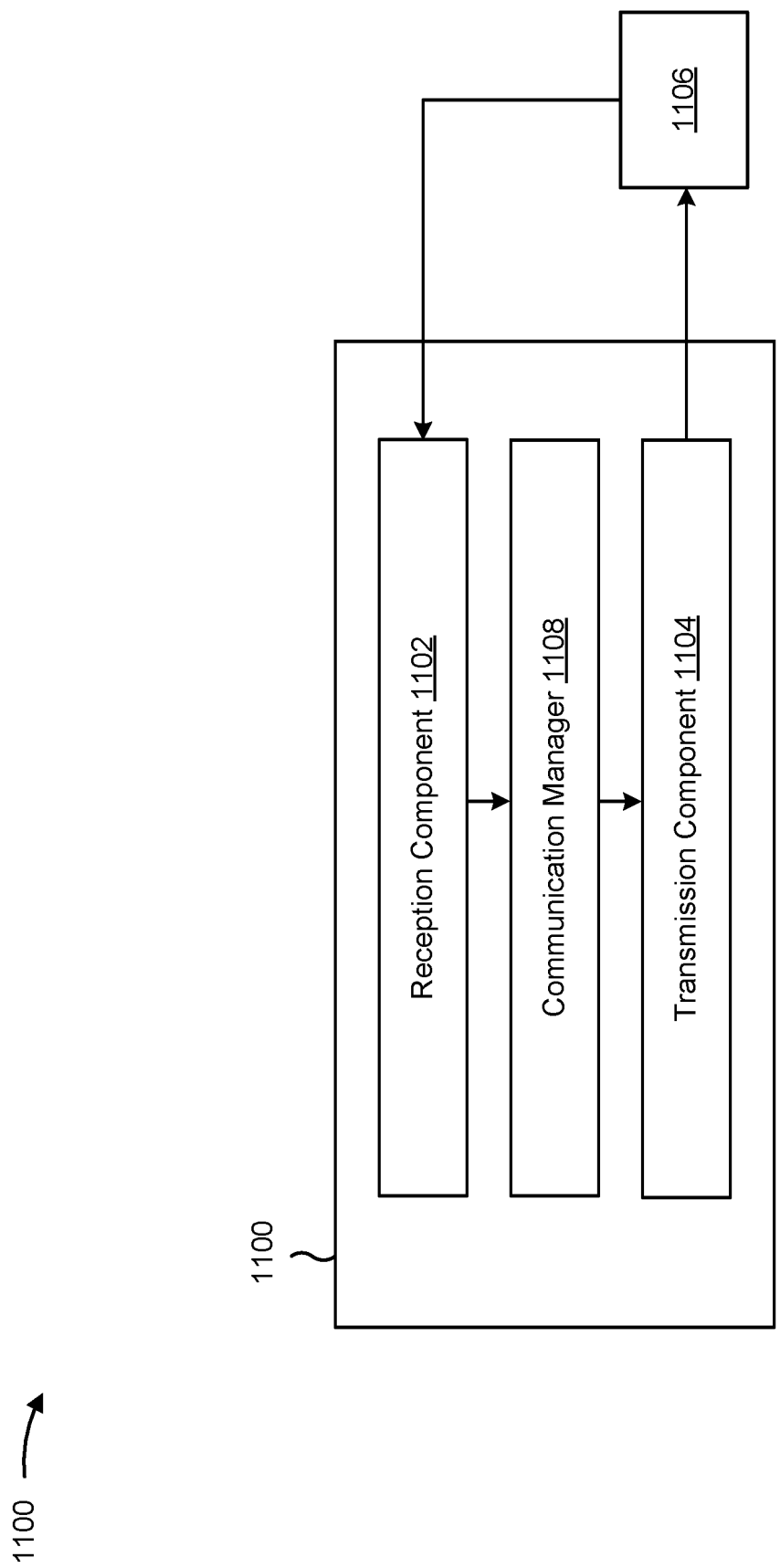
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a RAN network node, or another wireless communication device) using the reception component 1102 and the transmission component 1104. As further shown, the apparatus 1100 may include a communication manager 1108 (e.g., the communication manager 140).

In some aspects, the apparatus 1100 may be configured to perform one or more operations described herein in connection with FIGS. 4-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1108, reception component 1102, and/or transmission component 1104 may establish, via a first subscriber service, at least one PDU session. The communication manager 1108 and/or reception component 1102 may obtain a first IP address associated with the first subscriber service. The communication manager 1108, reception component 1102, and/or transmission component 1104 may register the first subscriber service with an IMS network using the first IP address. The communication manager 1108, reception component 1102, and/or transmission component 1104 may register a second subscriber service with the IMS network using a second IP address, wherein the second subscriber service uses the at least one PDU session of the first subscriber service.

The communication manager 1108 may generate the second IP address based at least in part on an IP prefix associated with the first subscriber service, and an IID associated with the second subscriber service.

The reception component 1102 may receive an indication of the second IP address from a network associated with the at least one PDU session.

The communication manager 1108 may generate the first IP address based at least in part on an IP prefix associated with the first subscriber service, and an IID associated with the first subscriber service.

The reception component 1102 may receive an indication of the first IP address from a network associated with the at least one PDU session.

The, reception component 1102 and/or transmission component 1104 may communicate, after registering the first subscriber service, via a first call associated with the first subscriber service.

The reception component 1102 may receive, after registering the second subscriber service, a request to initiate a second call via the second subscriber service.

The communication manager 1108 may initiate a hold on the first call associated with first subscriber service.

The reception component 1102 and/or transmission component 1104 may communicate via the second call using the at least one PDU session of the first subscriber service.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: establishing, via a first subscriber service, at least one protocol data unit (PDU) session; obtaining a first internet protocol (IP) address associated with the first subscriber service; registering the first subscriber service with an IP multimedia subsystem (IMS) network using the first IP address; and registering a second subscriber service with the IMS network using a second IP address, wherein the second subscriber service uses the at least one PDU session of the first subscriber service.

Aspect 2: The method of Aspect 1, wherein the at least one PDU session comprises a single PDU session, wherein the first subscriber service uses the single PDU session, and wherein the second subscriber service uses the single PDU session.

Aspect 3: The method of Aspect 1, wherein the at least one PDU session comprises a first PDU session and a second PDU session, wherein the first subscriber service uses the first PDU session, and wherein the second subscriber service uses the second PDU session.

Aspect 4: The method of any of Aspects 1-3, wherein the at least one PDU session uses a single transmission chain.

Aspect 5: The method of any of Aspects 1-4, further comprising generating the second IP address based at least in part on: an IP prefix associated with the first subscriber service, and an interface identifier associated with the second subscriber service.

Aspect 6: The method of any of Aspects 1-4, further comprising: receiving an indication of the second IP address from a network associated with the at least one PDU session.

Aspect 7: The method of any of Aspects 1-6, further comprising generating the first IP address based at least in part on: an IP prefix associated with the first subscriber service, and an interface identifier associated with the first subscriber service.

Aspect 8: The method of any of Aspects 1-6, further comprising: receiving an indication of the first IP address from a network associated with the at least one PDU session.

Aspect 9: The method of any of Aspects 1-8, wherein the first IP address and the second IP address comprise: a first IPv4 IP address and a second IPv4 address, or a first IPv6 IP address and a second IPv6 address.

Aspect 10: The method of any of Aspects 1-9, wherein registration of the first IP address comprises associating the first IP address with a first Session Initiation Protocol Uniform Resource Identifier (SIP-URI) of the first subscriber service, and wherein registration of the second IP address comprises associating the second IP address with a second SIP-URI of the second subscriber service.

Aspect 11: The method of any of Aspects 1-10, further comprising: communicating, after registering the first subscriber service, via a first call associated with the first subscriber service; receiving, after registering the second subscriber service, a request to initiate a second call via the second subscriber service; initiating a hold on the first call associated with first subscriber service; and communicating via the second call using the at least one PDU session of the first subscriber service.

Aspect 12: The method of Aspect 11, wherein the second call comprises: a mobile terminated call, or a mobile originated call.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   establishing, via a first subscriber service, at least one protocol data unit (PDU) session;
   obtaining a first internet protocol (IP) address associated with the first subscriber service;
   registering the first subscriber service with an IP multimedia subsystem (IMS) network using the first IP address; and
   registering a second subscriber service with the IMS network using a second IP address, wherein the second subscriber service uses the at least one PDU session of the first subscriber service to register the second subscriber service with the IMS network and perform Session Initiation Protocol (SIP) procedures for the second subscriber service.

2. The method of claim 1, wherein the at least one PDU session comprises a single PDU session,
   wherein the first subscriber service uses the single PDU session, and
   wherein the second subscriber service uses the single PDU session.

3. The method of claim 1, wherein the at least one PDU session comprises a first PDU session and a second PDU session,
   wherein the first subscriber service uses the first PDU session, and
   wherein the second subscriber service uses the second PDU session.

4. The method of claim 1, wherein the at least one PDU session uses a single transmission chain.

5. The method of claim 1, further comprising generating the second IP address based at least in part on:
   an IP prefix associated with the first subscriber service, and
   an interface identifier associated with the second subscriber service.

6. The method of claim 1, further comprising:
   receiving an indication of the second IP address from a network associated with the at least one PDU session.

7. The method of claim 1, further comprising generating the first IP address based at least in part on:
   an IP prefix associated with the first subscriber service, and
   an interface identifier associated with the first subscriber service.

8. The method of claim 1, further comprising:
   receiving an indication of the first IP address from a network associated with the at least one PDU session.

9. The method of claim 1, wherein registration of the first IP address comprises associating the first IP address with a first SIP Uniform Resource Identifier (SIP-URI) of the first subscriber service, and
   wherein registration of the second IP address comprises associating the second IP address with a second SIP-URI of the second subscriber service.

10. The method of claim 1, further comprising:
    communicating, after registering the first subscriber service, via a first call associated with the first subscriber service;
    receiving, after registering the second subscriber service, a request to initiate a second call via the second subscriber service;
    initiating a hold on the first call associated with the first subscriber service; and
    communicating via the second call using the at least one PDU session of the first subscriber service.

11. The method of claim 10, wherein the second call comprises:
    a mobile terminated call, or
    a mobile originated call.

12. A user equipment (UE) for wireless communication, comprising:
    one or more memories; and
    one or more processors, coupled to the one or more memories, configured to:
    establish, via a first subscriber service, at least one protocol data unit (PDU) session;
    obtain a first internet protocol (IP) address associated with the first subscriber service;
    register the first subscriber service with an IP multimedia subsystem (IMS) network using the first IP address; and
    register a second subscriber service with the IMS network using a second IP address, wherein the second subscriber service uses the at least one PDU session of the first subscriber service to register the second subscriber service with the IMS network and perform Session Initiation Protocol (SIP) procedures for the second subscriber service.

13. The UE of claim 12, wherein the at least one PDU session comprises a single PDU session,
    wherein the first subscriber service uses the single PDU session, and
    wherein the second subscriber service uses the single PDU session.

14. The UE of claim 12, wherein the at least one PDU session comprises a first PDU session and a second PDU session,
    wherein the first subscriber service uses the first PDU session, and
    wherein the second subscriber service uses the second PDU session.

15. The UE of claim 12, wherein the at least one PDU session uses a single transmission chain.

16. The UE of claim 12, wherein the one or more processors are further configured to generate the second IP address based at least in part on:
    an IP prefix associated with the first subscriber service, and
    an interface identifier associated with the second subscriber service.

17. The UE of claim 12, wherein the one or more processors are further configured to:
    receive an indication of the second IP address from a network associated with the at least one PDU session.

18. The UE of claim 12, wherein the one or more processors are further configured to generate the first IP address based at least in part on:

an IP prefix associated with the first subscriber service, and an interface identifier associated with the first subscriber service.

19. The UE of claim 12, wherein the one or more processors are further configured to:
receive an indication of the first IP address from a network associated with the at least one PDU session.

20. The UE of claim 12, wherein the one or more processors, to register the first IP address, are configured to associate the first IP address with a first SIP Uniform Resource Identifier (SIP-URI) of the first subscriber service, and wherein the one or more processors, to register the second IP address, are configured to associate the second IP address with a second SIP-URI of the second subscriber service.

21. The UE of claim 12, wherein the one or more processors are further configured to:
communicate, after registering the first subscriber service, via a first call associated with the first subscriber service;
receive, after registering the second subscriber service, a request to initiate a second call via the second subscriber service;
initiate a hold on the first call associated with the first subscriber service; and
communicate via the second call using the at least one PDU session of the first subscriber service.

22. The UE of claim 21, wherein the second call comprises:
a mobile terminated call, or
a mobile originated call.

23. A non-transitory computer-readable medium storing a set of instructions for wireless communication, the set of instructions comprising:
one or more instructions that, when executed by one or more processors of a user equipment (UE), cause the UE to:
establish, via a first subscriber service, at least one protocol data unit (PDU) session;
obtain a first internet protocol (IP) address associated with the first subscriber service;
register the first subscriber service with an IP multimedia subsystem (IMS) network using the first IP address; and
register a second subscriber service with the IMS network using a second IP address, wherein the second subscriber service uses the at least one PDU session of the first subscriber service to register the second subscriber service with the IMS network and perform Session Initiation Protocol (SIP) procedures for the second subscriber service.

24. The non-transitory computer-readable medium of claim 23, wherein the at least one PDU session comprises a single PDU session,
wherein the first subscriber service uses the single PDU session, and
wherein the second subscriber service uses the single PDU session.

25. The non-transitory computer-readable medium of claim 23, wherein the at least one PDU session comprises a first PDU session and a second PDU session,
wherein the first subscriber service uses the first PDU session, and
wherein the second subscriber service uses the second PDU session.

26. An apparatus for wireless communication, comprising:
means for establishing, via a first subscriber service, at least one protocol data unit (PDU) session;
means for obtaining a first internet protocol (IP) address associated with the first subscriber service;
means for registering the first subscriber service with an IP multimedia subsystem (IMS) network using the first IP address; and
means for registering a second subscriber service with the IMS network using a second IP address, wherein the second subscriber service uses the at least one PDU session of the first subscriber service to register the second subscriber service with the IMS network and perform Session Initiation Protocol (SIP) procedures for the second subscriber service.

27. The apparatus of claim 26, wherein the at least one PDU session comprises a single PDU session,
wherein the first subscriber service uses the single PDU session, and
wherein the second subscriber service uses the single PDU session.

28. The apparatus of claim 26, wherein the at least one PDU session comprises a first PDU session and a second PDU session,
wherein the first subscriber service uses the first PDU session, and
wherein the second subscriber service uses the second PDU session.

29. The method of claim 1, wherein the first IP address comprises a first IPv4 address and the second IP address comprises a second IPv4 address.

30. The method of claim 1, wherein the first IP address comprises a first IPV6 address and the second IP address comprises a second IPv6 address.

* * * * *